A. HAMAR.
PRESERVING WOOD FROM DECAY, &c.
No. 48,636. Patented July 4, 1865.
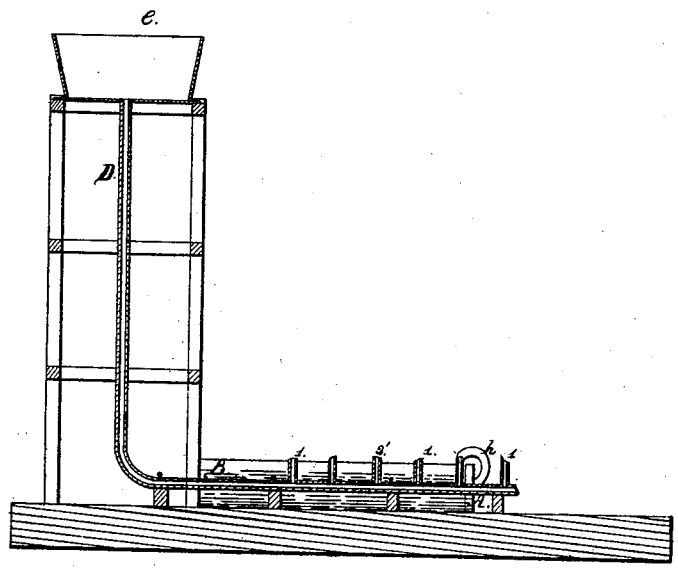
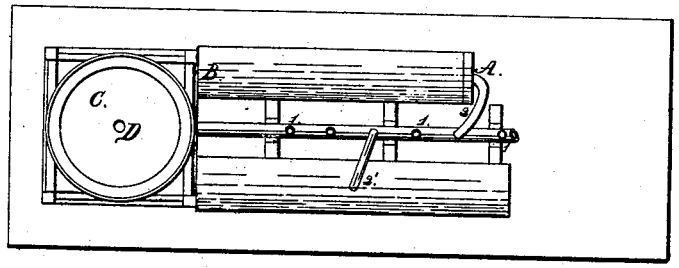

UNITED STATES PATENT OFFICE.

ALEXANDER HAMAR, OF HUNGARY, AUSTRIA, ASSIGNOR TO JOHN C. FRÉMONT, OF NEW YORK CITY.

IMPROVEMENT IN PRESERVING WOOD FROM DECAY, &c.

Specification forming part of Letters Patent No. 48,636, dated July 4, 1865.

*To all whom it may concern:*

Be it known that I, ALEXANDER HAMAR, a citizen of Hungary, in the Empire of Austria, now residing in the city of New York, have invented a new and useful Method of Preserving Timber from Destructive Insects and Decay; and I do hereby declare that the following is a full, clear, and exact description thereof, reference being had to the accompanying drawing, making part of this specification, in which one mode of applying my invention is shown.

This process consists in first freeing the fibers of timbers from all deleterious substances contained in the texture or cells, causing rottenness and decomposition—such as starch, saccharine, albumen, fibrine, and lactive—supplanting them by a material resisting both rottenness and inflammability.

The process in achieving the above is as follows: A vat or tank, C, is placed on a suitable support at an elevation of about twenty-six feet, from the center of which is suspended a perpendicular tube, D, which tube is from the ground continued horizontally any required length. To this tube, on its horizontal extension, are attached tubes 1, of smaller diameter, at suitable intervals, each of which is again attached to one end of a stick of timber by the pipes 2 at A. The vat or tank is filled with a solution of sulphate of iron in water in proportion of one pound of the sulphate to one hundred pounds of water. It is obvious that for some descriptions of timber a slight departure from this proportion may be found beneficial; but such change will of course not affect my invention; and it is also obvious that in some conditions of use timber may require other metallic sulphates, all of which are embraced, or contemplated to be embraced, in my invention. The pressure of the weight of this fluid, increased by the pressure of the atmosphere above it, exerts a pressure upon the end A of the beam, and forces the sap contained in the cells out at B. Whenever the fluid issues at B in the same purity as it enters at A, then the process of ferrification is performed, the timber is freed from sap, and the solution fills the cells.

Thus prepared timber will resist all detrimental influences from weather, insects, and time, and it is not inflammable.

Wood by the same process may be made of any color by a proper preparation and coloring of the solution. This method is shown by the use of a cap covering the end of the stick in which the tube is inserted.

What I claim as my invention, and desire to secure by Letters Patent, is—

Preserving wood from decay, insects, and other destructive agents by means of a solution prepared substantially as herein described, and applied in the manner herein set forth.

In testimony whereof I have hereunto subscribed my name.

ALEXANDER HAMAR.

Witnesses:
WM. D. BALDWIN,
JOHN S. HOLLINGSHEAD.